United States Patent
Wang et al.

(10) Patent No.: US 10,305,523 B2
(45) Date of Patent: May 28, 2019

(54) DEVICE AND METHOD OF HANDLING SIGNAL INTERFERENCE

(71) Applicant: Realtek Semiconductor Corp., HsinChu (TW)

(72) Inventors: Chin-Liang Wang, Hsinchu (TW);
Min-Chau Jan, Taipei (TW);
Wen-Shan Wang, Tainan (TW);
Yuan-Shuo Chang, Hsinchu (TW);
Wu-Chi Wang, Hsinchu (TW);
Ying-Hsi Lin, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/120,417

(22) Filed: Sep. 3, 2018

(65) Prior Publication Data

US 2019/0074855 A1    Mar. 7, 2019

Related U.S. Application Data

(60) Provisional application No. 62/553,918, filed on Sep. 4, 2017.

(30) Foreign Application Priority Data

Feb. 27, 2018   (TW) .............................. 107106561 A (51) Int. Cl.
*H04B 1/04*     (2006.01)
(52) U.S. Cl.
CPC .................................. *H04B 1/0475* (2013.01)

(58) Field of Classification Search
CPC ...... H04B 1/0475; H04B 1/005; H04B 15/04; H04B 17/12; H04B 1/0483; H04B 2215/00; H04B 2001/0441; H03F 3/24; H03F 1/3223
See application file for complete search history.

(56) References Cited

U.S. PATENT DOCUMENTS

| | | | |
|---|---|---|---|
| 2012/0321018 A1* | 12/2012 | Chen ................... | H04B 1/0475 375/296 |
| 2013/0217343 A1* | 8/2013 | Tenbroek .............. | H04B 17/12 455/77 |
| 2014/0218255 A1* | 8/2014 | Sanford ................ | H01Q 1/525 343/837 |
| 2015/0085634 A1* | 3/2015 | Yu ........................ | H04B 1/005 370/201 |
| 2016/0099733 A1* | 4/2016 | Weissman ............ | H04B 1/0475 455/114.2 |

* cited by examiner

*Primary Examiner* — Thanh C Le
(74) *Attorney, Agent, or Firm* — Winston Hsu (57) ABSTRACT

A transmitting device, for handling signal interference, comprises a first transmitting circuit, for processing a first plurality of baseband signals, to generate a first plurality of radio frequency signals; a second transmitting circuit, for processing a second plurality of baseband signals and a plurality of input signals, to generate a second plurality of radio frequency signals; a feedback circuit, coupled to the second transmitting circuit, for processing the second plurality of radio frequency signals and a plurality of leakage signals, to generate a plurality of error signals; and a control circuit, coupled to the first transmitting circuit, the second transmitting circuit and the feedback circuit, for generating the plurality of input signals according to the first plurality of baseband signals and the plurality of error signals.

10 Claims, 9 Drawing Sheets

DEVICE AND METHOD OF HANDLING SIGNAL INTERFERENCE

CROSS REFERENCE TO RELATED APPLICATIONS

This application claims the benefit of U.S. Provisional Application No. 62/553,918, filed on Sep. 4, 2017, which is incorporated herein by reference.

BACKGROUND OF THE INVENTION

1. Field of the Invention

The present invention relates to a device and a method used in a wireless communication system, and more particularly, to a device and a method of handling signal interference.

2. Description of the Prior Art

According to the prior art, when signals of different types (e.g., signals of different communication standards) are transmitted simultaneously, the signals may interfere with each other. The transmissions of the signals are affected, and the transmission specifications are not satisfied. Several conventional techniques have been proposed to reduce such signal interference, such as digital pre-distortion or more expensive filters. However, these methods have the disadvantage of poor performance of interference cancellation or excessive cost. Thus, how to reduce the signal interference in an effective and inexpensive way is an important problem to be solved.

SUMMARY OF THE INVENTION

The present invention therefore provides a communication device and method for handling signal interference to solve the abovementioned problem.

A transmitting device, for handling signal interference, comprises a first transmitting circuit, for processing a first plurality of baseband signals, to generate a first plurality of radio frequency signals; a second transmitting circuit, for processing a second plurality of baseband signals and a plurality of input signals, to generate a second plurality of radio frequency signals, wherein a first frequency of the first plurality of radio frequency signals and a second frequency of the second plurality of radio frequency signals are different; a feedback circuit, coupled to the second transmitting circuit, for processing the second plurality of radio frequency signals and a plurality of leakage signals, to generate a plurality of error signals, wherein the plurality of leakage signals are related to the first plurality of radio frequency signals; and a control circuit, coupled to the first transmitting circuit, the second transmitting circuit and the feedback circuit, for generating the plurality of input signals according to the first plurality of baseband signals and the plurality of error signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
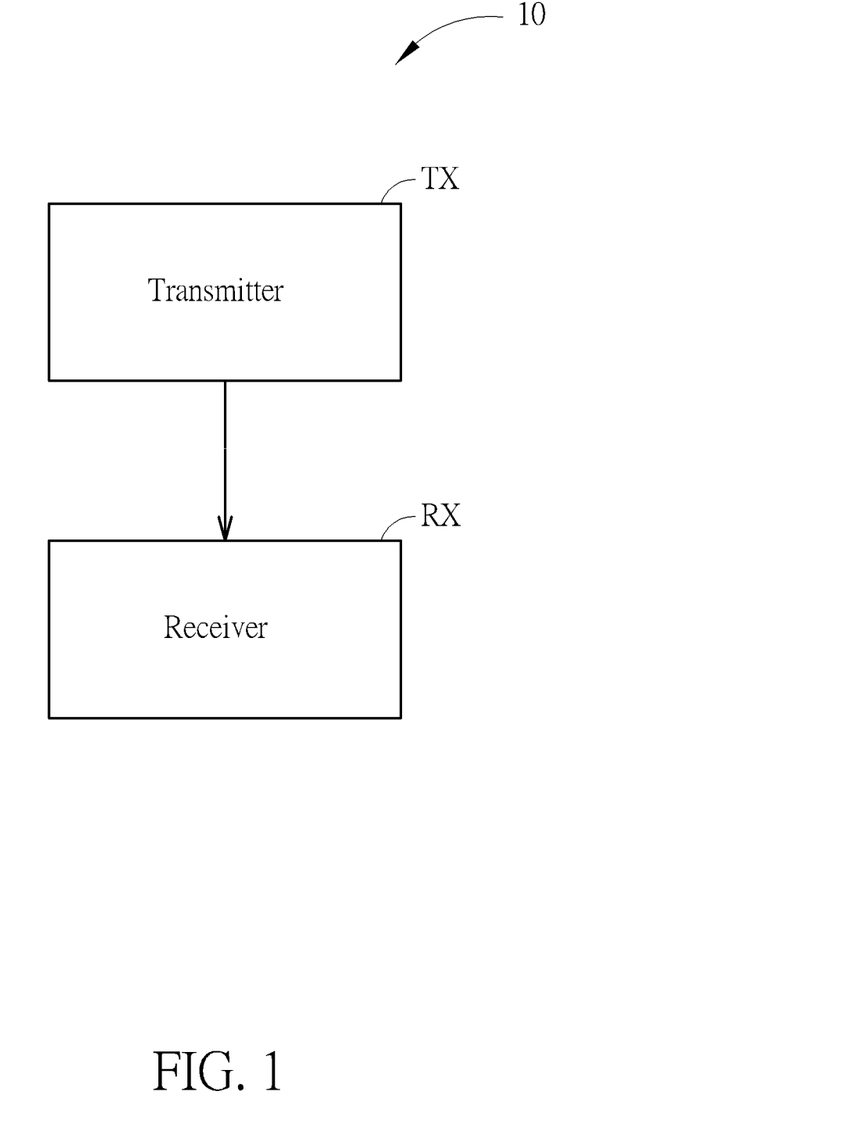
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. For example, the communication system 10 may be any wired communication system such as an asymmetric digital subscriber line (ADSL) system, a power line communication (PLC) system or an Ethernet over coax (EOC). Or, the communication system 10 may be any wireless communication system such as a Bluetooth (BT), a wireless local area network (WLAN), a Digital Video Broadcasting (DVB) system, a Long Term Evolution (LTE) system, a Long Term Evolution-advanced (LTE-A) system or a 5th generation (5G) system. In addition, the transmitter TX and the receiver RX may be installed in a mobile phone, a laptop, a tablet computer, but are not limited herein.

Figure 2:
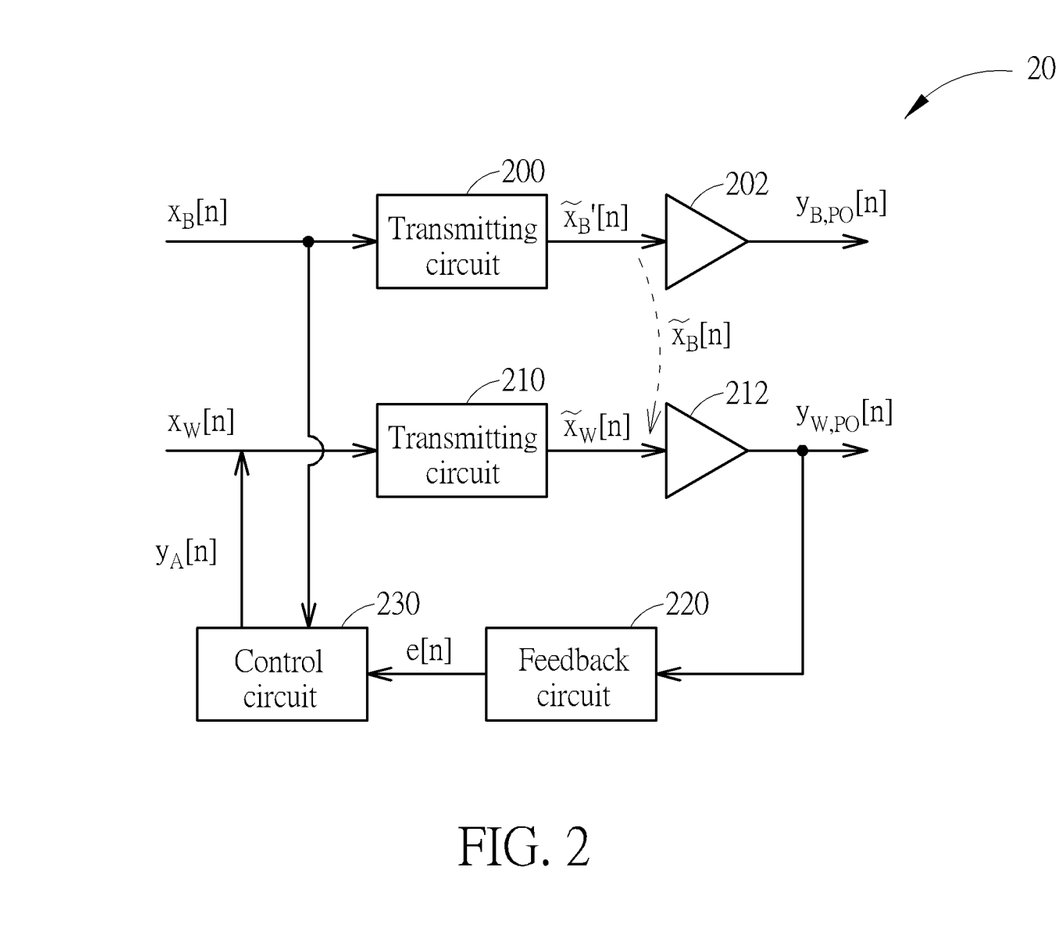
FIG. 2 is a schematic diagram of a transmitting device according to an example of the present invention.

FIG. 2 is a schematic diagram of a transmitting device 20 according to an example of the present invention. The transmitting device 20 may be utilized in the transmitter TX in FIG. 1, to cancel signal interference, such as an interference of signals of different types. The transmitting device 20 includes a transmitting circuit 200, an amplifier 202, a transmitting circuit 210, an amplifier 212, a feedback circuit 220 and a control circuit 230. In detail, the transmitting circuit 200 is used for processing baseband signals $x_B[n]$ (e.g., complex signals), to generate radio frequency signals $\tilde{x}_B'[n]$. The transmitting circuit 210 is used for processing baseband signals $x_W[n]$ and input signals $y_A[n]$, to generate radio frequency signals $\tilde{x}_W[n]$, wherein a frequency $w_B$ of the radio frequency signals $\tilde{x}_B'[n]$ and a frequency $w_W$ of the radio frequency signals $\tilde{x}_W[n]$ are different. The feedback circuit 220 is coupled to the transmitting circuit 210, and is used for processing the radio frequency signals $\tilde{x}_W[n]$ and leakage signals $\tilde{x}_B[n]$ (e.g., amplified signals of summed signals), to generate error signals $e[n]$, wherein the leakage signals $\tilde{x}_B[n]$ are related to the radio frequency signals $\tilde{x}_B[n]$. The control circuit 230 is coupled to the transmitting circuit 200, the transmitting circuit 210 and the feedback circuit 220, and is used for generating the input signals $y_A[n]$ according to the baseband signals $x_{13}[n]$ and the error signals $e[n]$. The amplifier 202 is coupled to the transmitting circuit 200, and the amplifier 212 is coupled to the transmitting circuit 210 and the feedback circuit 220. The transmitting device 20 may transmit amplified signals $y_{B,PO}[n]$ obtained from processing the radio frequency signals $\tilde{x}_B'[n]$ by the amplifier 202 and may transmit amplified signals $y_{W,PO}[n]$ obtained from processing summed signals of the radio frequency signals $\tilde{x}_W[n]$ and the leakage signals $\tilde{x}_B[n]$ by the amplifier 212. In the present example, an index n may range from 0 to N−1, where N is a positive integer. In addition, assuming that there is an attenuation gain g between the transmitting circuit 200 and the transmitting circuit 210, the leakage signals $\tilde{x}_B[n]=g\tilde{x}_B'[n]$ can be obtained.

According to the prior art, when the baseband signals $x_B[n]$ and the baseband signals $x_W[n]$ are transmitted simultaneously, the leakage signals $\tilde{x}_B[n]$ interferes with the radio frequency signals $\tilde{x}_W[n]$. The transmission of the radio frequency signals $\tilde{x}_W[n]$ is affected, and the transmission specifications are not satisfied. According to the present invention, the use of the feedback circuit 220 and the control circuit 230 keeps the integrity of the radio frequency signals $\tilde{x}_W[n]$ while significantly eliminating the leakage signals $\tilde{x}_B[n]$.

Figure 3:
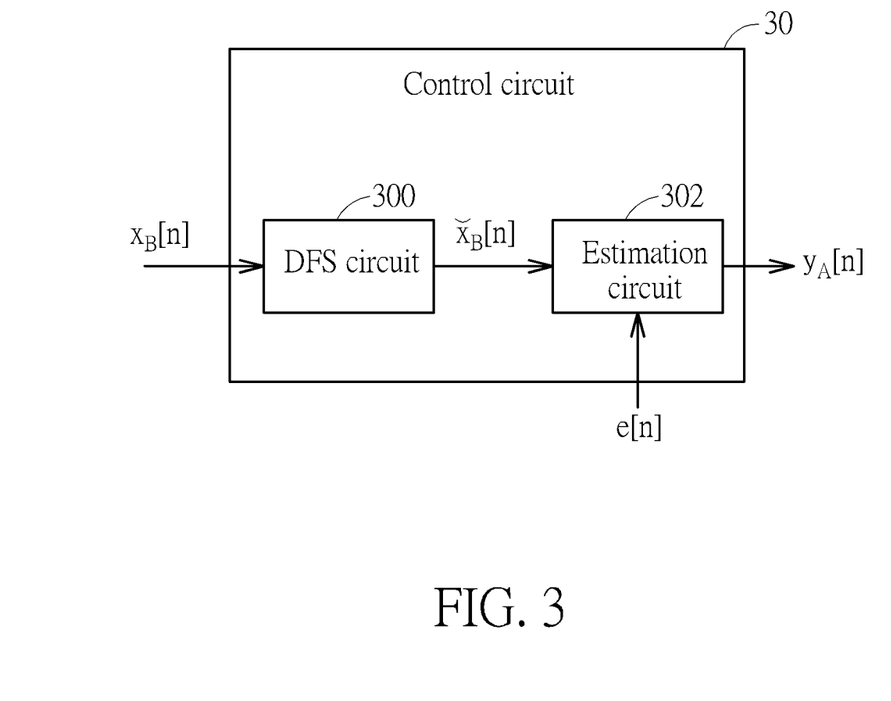
FIG. 3 is a schematic diagram of a control circuit according to an example of the present invention.

FIG. 3 is a schematic diagram of a control circuit 30 according to an example of the present invention. The control circuit 30 may be utilized in the transmitting device 20 in FIG. 2, to realize the control circuit 230. The control circuit 30 includes a Digital Frequency Shifting (DFS) circuit 300 and an estimation circuit 302. In detail, the DFS circuit 300 is coupled to the transmitting circuit 200, and is used for processing the baseband signals $x_B[n]$ according to the frequency $w_B$ and the frequency $w_W$, to generate frequency shifted signals $\check{x}_B[n]$. The estimation circuit 302 is coupled to the DFS circuit 300, the transmitting circuit 210 and the feedback circuit 220, and is used for processing the frequency shifted signals $\check{x}_B[n]$ and the error signals $e[n]$, to generate the input signals $y_A[n]$, wherein the error signals $e[n]$ are related to the leakage signals $\tilde{x}_B[n]$ and the radio frequency signals $\tilde{x}_W[n]$.

In one example, according to FIG. 3, a frequency of processed signals and the frequency $w_B$ are the same, when the transmitting circuit 210 processes the frequency shifted signals $\check{x}_B[n]$ to obtain the processed signals. In one example, the estimation circuit 302 processes the frequency shifted signals $\check{x}_B[n]$ and the error signals $e[n]$ according to a modified normalized least mean square (NLMS) filter algorithm. In one example, according to the modified NLMS filter algorithm, the error signals $e[n]$ are defined according to the following equations:

$$e[n|k]=d[n]-w_k^H x_n, \text{ and}$$

$$\hat{e}[n|n+1]=e[n|n+1]-e[n-1|n+1], \quad \text{(Eq.1)}$$

where $x_n$ is an input vector of the modified NLMS filter algorithm, $w_k$ is a weight vector of the modified NLMS filter algorithm and $d[n]$ are the leakage signals ($d[n]=\tilde{x}_B[n]$).

Figure 4:
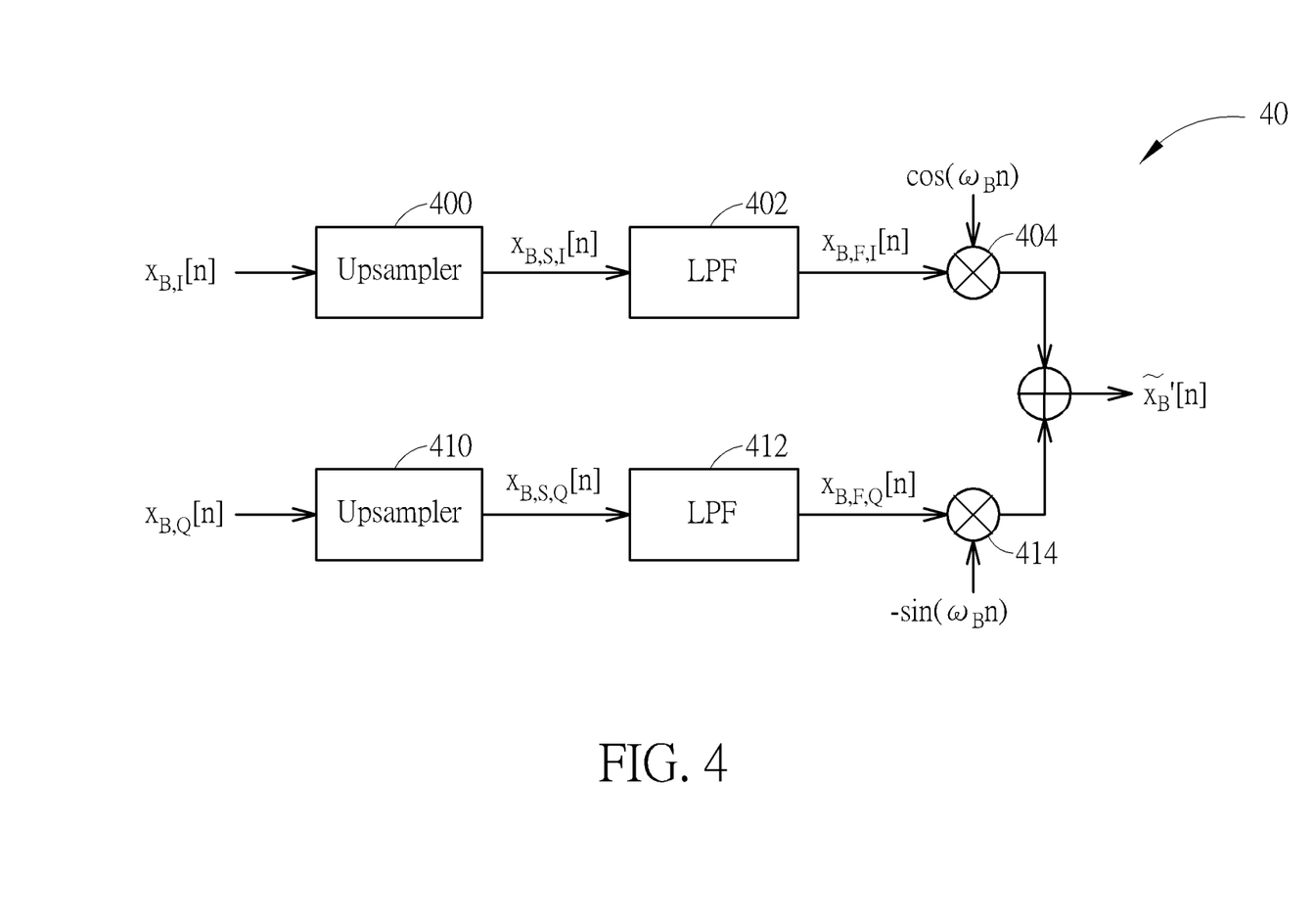
FIG. 4 is a schematic diagram of a transmitting circuit according to an example of the present invention.

FIG. 4 is a schematic diagram of a transmitting circuit 40 according to an example of the present invention. The transmitting circuit 40 includes an upsampler 400, a low-pass filter (LPF) 402, a mixer 404, an upsampler 410, a LPF 412 and a mixer 414. In detail, the upsamplers 400 and 410 process the baseband signals $x_B[n]=x_{B,I}[n]+jx_{B,Q}[n]$, to generate upsampled signals $x_{B,S}[n]=x_{B,S,I}[n]+jx_{B,S,Q}[n]$, when the transmitting circuit 40 is used for realizing the transmitting circuit 200. The LPFs 402 and 412 are coupled to the upsamplers 400 and 410, respectively, and are used for filtering the upsampled signals $x_{B,S}[n]$, to generate filtered signals $x_{B,F}[n]=x_{B,F,I}[n]+jx_{B,F,Q}[n]$. The mixers 404 and 414 are coupled to the LPFs 402 and 412, respectively, and are used for mixing the filtered signals $x_{B,F}[n]$ according to the frequency $w_B$, to generate the radio frequency signals $\tilde{x}_B'[n]$.

Similarly, the upsamplers 400 and 410 process the baseband signals $x_W[n]=x_{W,I}[n]+jx_{W,Q}[n]$, to generate upsampled signals $x_{W,S}[n]=x_{W,S,I}[n]+jx_{W,S,Q}[n]$, when the transmitting circuit 40 is used for realizing the transmitting circuit 210. The LPFs 402 and 412 are coupled to the upsamplers 400 and 410, respectively, and are used for filtering the upsampled signals $x_{W,S}[n]$, to generate filtered signals $x_{W,F}[n]=x_{W,F,I}[n]+jx_{W,F,Q}[n]$. The mixers 404 and 414 are coupled to the LPFs 402 and 412, respectively, and are used for mixing the filtered signals $x_{W,F}[n]$ according to the frequency $w_W$, to generate the radio frequency signals $\tilde{x}_W[n]$.

Figure 5:
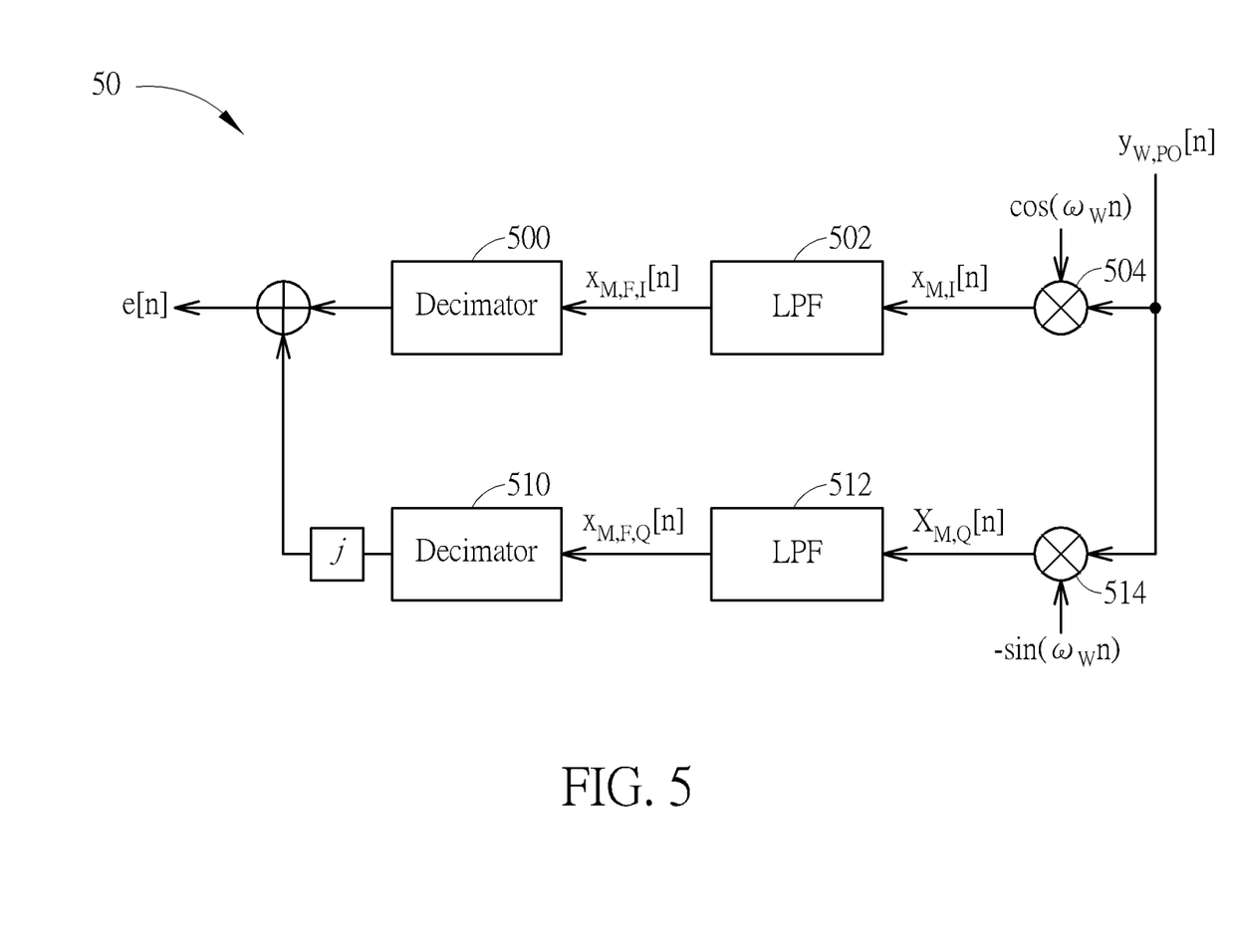
FIG. 5 is a schematic diagram of a feedback circuit according to an example of the present invention.

FIG. 5 is a schematic diagram of a feedback circuit 50 according to an example of the present invention. The feedback circuit 50 includes a decimator 500, a LPF 502, a mixer 504, a decimator 510, a LPF 512 and a mixer 514. In detail, the mixers 504 and 514 are used for mixing the summed signals (or the amplified signals $y_{W,PO}[n]$) of the radio frequency signals $\tilde{x}_W[n]$ and the leakage signals $\tilde{x}_B[n]=\tilde{x}_{B,I}[n]+j\tilde{x}_{B,Q}[n]$ according to the frequency $w_W$, to generate mixed signals $x_M[n]=x_{M,I}[n]+jx_{M,Q}[n]$. The LPFs 502 and 512 are coupled to the mixers 504 and 514, respectively, and are used for filtering the mixed signals $x_M[n]$, to generate the filtered signals $x_{W,F}[n]=x_{M,F,I}[n]+jx_{M,F,Q}[n]$. The decimators 500 and 510 are coupled to the LPFs 502 and 512, respectively, and are used for processing the filtered signals $x_{W,F}[n]$, to generate the error signals $e[n]$.

In one example, the baseband signals $x_B[n]$ are BT signals and the baseband signals $x_W[n]$ are WEAN signals, but are not limited herein. Those skilled in the art can apply the present invention to a transmitter that simultaneously transmits signals with multiple types, to solve the problem of signal interference.

According to the above description, an example of the present invention is provided as follows by using the BT and the WLAN according to the transmitting device 20.

First, BT baseband signals of the transmitting circuit 200 and WLAN baseband signals of the transmitting circuit 210 are defined as follows:

$$x_B[n]=x_{B,I}[n]+jx_{B,Q}[n]; \text{ and}$$

$$x_W[n]=x_{W,I}[n]+jx_{W,Q}[n], \quad \text{(Eq.2)}$$

where $x_{B,I}[n]$ and $x_{B,Q}[n]$ are real-part signals and imaginary-part signals of the BT baseband signals, respectively, and $x_{W,I}[n]$ and $x_{W,Q}[n]$ are real-part signals and imaginary-part signals of the WLAN baseband signals, respectively. Then, the BT baseband signals and the WLAN baseband signals are respectively processed by corresponding upsampling operations (e.g., upsamplers and LPFs) and upconverting operations (i.e., modulation) according to the corresponding radio frequencies, to become the BT radio frequency signals $\tilde{x}_B'[n]$ and the WLAN radio frequency signals $\tilde{x}_W[n]$ which are expressed as follows:

$$\tilde{x}_B'[n]=x_{B,I}[n]\cos(w_B n+\theta_B)-x_{B,Q}[n]\sin(w_B n+\theta_B); \text{ and}$$

$$\tilde{x}_W[n]=x_{W,I}[n]\cos(w_W n+\theta_W)-x_{W,Q}[n]\sin(w_W n+\theta_W), \quad \text{(Eq.3)}$$

where $w_B$ and $w_W$ are (e.g., different) radio frequencies (i.e., carrier frequencies) of the BT and the WLAN, respectively, and $\theta_B$ and $\theta_W$ are (e.g., different) phases of mixers of the BT and the WLAN, respectively.

Since the BT radio frequency signals $\tilde{x}_B'[n]$ interferes with the WLAN radio frequency signals $\tilde{x}_W[n]$, considering the attenuation gain g of the path between the BT and the WLAN, the BT leakage signals $\tilde{x}[n]$ can be expressed as:

$$\tilde{x}_B[n]=g\cdot\tilde{x}_B'[n]=g(x_{B,I}[n]\cos(w_Bn+\theta_B)-x_{B,Q}[n]\sin(w_Bn+\theta_B)). \quad \text{(Eq.4)}$$

In the present invention, it is assumed that the amplifier 212 has a third-order nonlinear model, and the amplified signals $y_{W,PO}[n]$ obtained from a processing of the amplifier 212 may be expressed as follows:

$$Y_{W,PO}[n] = \quad \text{(Eq. 5)}$$
$$a_1(\tilde{x}_B[n]+\tilde{x}_W[n])+a_3(\tilde{x}_B[n]+\tilde{x}_W[n])^3 = a_1(\tilde{x}_B[n]+\tilde{x}_W[n])+$$
$$a_3(\tilde{x}_B^3[n]+\tilde{x}_W^3[n])+\underbrace{3a_3\tilde{x}_B^2[n]\tilde{x}_W[n]}_{S_1}+\underbrace{3a_3\tilde{x}_B[n]\tilde{x}_W^2[n]}_{S_2},$$

where $a_1$ and $a_3$ are a first-order coefficient and a third-order coefficient of the amplifier 212, respectively. According to (Eq. 5), under an effect of the nonlinear model of the amplifier, a sum of the WLAN radio frequency signals $\tilde{x}_W[n]$ and the BT leakage signals $\tilde{x}_B[n]$ causes intermodulation interference signals $S_1$ and $S_2$.

An example of a control circuit of the present invention is described in the two following parts. First, an architecture and an operation of the control circuit are explained. In detail, the control circuit includes a DFS circuit and an estimation circuit. For example, the estimation circuit is an adaptive filter for performing an adaptive algorithm, wherein the adaptive algorithm may be a NLMS filter algorithm, but is not limited herein. Related parameters of the adaptive algorithm and three operating signals of the estimation circuit: desired signals, estimation circuit output signals and error signals, are defined in the following paragraphs. Next, performance of the estimation circuit is further improved according to the modified NLMS filter algorithm.

Considering that the radio frequency $w_B$ of the BT and the radio frequency $w_W$ of the WLAN are different, the DFS circuit first processes the BT baseband signals $x_{13}[n]$. In detail, the DFS circuit shifts the BT baseband signals $x_B[n]$ to a frequency $(w_B-w_W)$ according to the radio frequencies $w_B$ and $w_W$, to obtain the frequency shifted signals $\tilde{x}_B[n]$. Thus, after the frequency shifted signals $\tilde{x}_B[n]$ is processed via an upconverting operation of the WLAN, the frequency of the generated signal may be the same as that of the BT leakage signal $\tilde{x}_B[n]$. The signal obtained after the adaptive filter processing the frequency shifted signals $\tilde{x}_B[n]$ is defined as:

$$y_A[n]=y_{A,I}[n]+jy_{A,Q}[n]. \quad \text{(Eq.6)}$$

Then, after performing the upsampling operations and the upconverting operations on the summed signals of the signal $y_A[n]$ and the WLAN baseband signals $x_W[n]$, the WLAN radio frequency signals $\tilde{x}_W[n]$ are generated.

According to the operations of the estimation circuit, the desired signals may be the BT leakage signals $\tilde{x}_B$M. The error signals (i.e., the input signals of the amplifier 212) is related to (or is treated as) a sum of the desired signals $\tilde{x}_B[n]$ and the WLAN radio frequency signals $\tilde{x}_W[n]$.

According to the above description, after the input signals of the amplifier 212 is passed through the amplifier 212 and is then passed through a feedback path, the resulted signal is provided an iterative operation to calculate appropriate estimation circuit parameter(s). Through the design of the architecture, the estimation circuit performs a cancellation operation on the BT leakage signals $\tilde{x}_B[n]$ before it enters the amplifier 212, to reduce interference signals outputted by the amplifier 212.

It should be noted that if the adaptive algorithm used by the estimation circuit is a conventional NLMS filter algorithm, the above design may significantly eliminate the BT leakage signals $\tilde{x}_B[n]$ while may eliminate a small portion of the WLAN baseband signals $x_W[n]$, and an extent of performance improvement is degraded. Thus, the present invention proposes a modified NLMS filter algorithm to mitigate the attenuation of the WLAN baseband signals $x_W[n]$.

First, two error terms (estimation circuit error signals) for the adaptive algorithm are defined as follows:

$$e[n|k]=d[n]-w_k^H x_n \quad \text{(Eq.7)}$$

$$\hat{e}[n|n+1]=e[n|n+1]-e[n-1|n+1]=(d[n]-d[n-1])-w_{n+1}^H(x_n-x_{n-1}), \quad \text{(Eq.8)}$$

where $x_n=[\tilde{x}_B[n], \tilde{x}_B[n-1], \ldots, \tilde{x}_B[n-L+1]]^T$ is an input vector of the adaptive algorithm, $w_n=[w_n[0], w_n[1], \ldots w_n[L-1]]^T$ is a weight vector of the adaptive algorithm and the desired signals (i.e., the BT leakage signals $\tilde{x}_B[n]$) are $d[n]=\tilde{x}_B[n]$.

Then, $\hat{d}[n]=d[n]-d[n-1]$ and $\hat{x}_n=x_n-x_{n-1}$ are defined as difference terms. According to the criteria of the Minimum Mean Square Error (MMSE), the following tow equations are considered:

$$\min_{w_{n+1}} \|w_{n+1}-w_n\|^2 \quad \text{(Eq. 9)}$$

$$\hat{e}[n|n+1]=\hat{d}[n]-w_{n+1}^H\hat{x}_n=0 \quad \text{(Eq.10)}$$

To solve the above equations, $\Delta w_{n+1}=w_{n+1}-w_n$ are defined and a cost function is defined according to a Lagrange multiplier method as follows:

$$J(w_{n+1})=\|\Delta w_{n+1}\|^2+\lambda^*\hat{e}[n|n+1]=\|\Delta w_{n+1}\|^2+\lambda^*(\hat{d}[n]-w_{n+1}^H\hat{x}_n), \quad \text{(Eq.11)}$$

where $\lambda$ is a complex Lagrange multiplier. Then, a partial differential of $w_{n+1}^H$ is performed on the cost function and a result is assumed 0, and the following result is obtained:

$$\frac{\partial J(w_{n+1})}{\partial w_{n+1}^H}=\Delta w_{n+1}-\frac{1}{2}\lambda^*\hat{x}_n=0 \quad \text{(Eq. 12)}$$

$$w_{n+1}=w_n+\frac{1}{2}\lambda^*\hat{x}_n \quad \text{(Eq. 13)}$$

Substituting (Eq.13) into (Eq.10), the complex Lagrange multiplier $\lambda$ may be derived as follows:

$$\lambda=\frac{2\hat{e}[n|n]}{\|\hat{x}_n\|^2} \quad \text{(Eq. 14)}$$

Then, substitute the Lagrange multiplier $\lambda$ into (Eq.13), $\alpha$ is added as an adaptive parameter (i.e., a step parameter), and a small positive value c is added to avoid an algorithm exception caused by $\|\hat{x}_n\|^2=0$. The following equation may be obtained:

$$w_{n+1} = w_n + \frac{\alpha \hat{e}^*[n|n]}{c + \|\hat{x}_n\|^2} \hat{x}_n \qquad (\text{Eq. 15})$$

It should be noted that although the desired signals may be regarded as the BT leakage signals $d[n]=\tilde{x}_B[n]$, in fact, the true value of $d[n]$ may not be directly obtained, such that $\hat{e}^*[n|n]$ in (Eq.15) may not be obtained via (Eq.7) and (Eq.8). Thus, the present invention provides a solution, to approximate $\hat{e}^*[n]$ with $\hat{e}^*[n]-e^*[n-1]$. (Eq.15) may be modified as follows:

$$w_{n+1} = w_n + \frac{\alpha(\hat{e}^*[n] - \hat{e}^*[n-1])}{c + \|\hat{x}_n\|^2} \hat{x}_n \qquad (\text{Eq. 16})$$

As the number of iterations increases, the accuracy of the above approximation may be improved. The reason is that when the number of iterations increases, the parameters converge gradually, such that $w_{n-1}{}^H x_{n-1}$ gets closer to $w_n{}^H x_{n-1}$ and the calculation result becomes more accurate.

Figure 6:
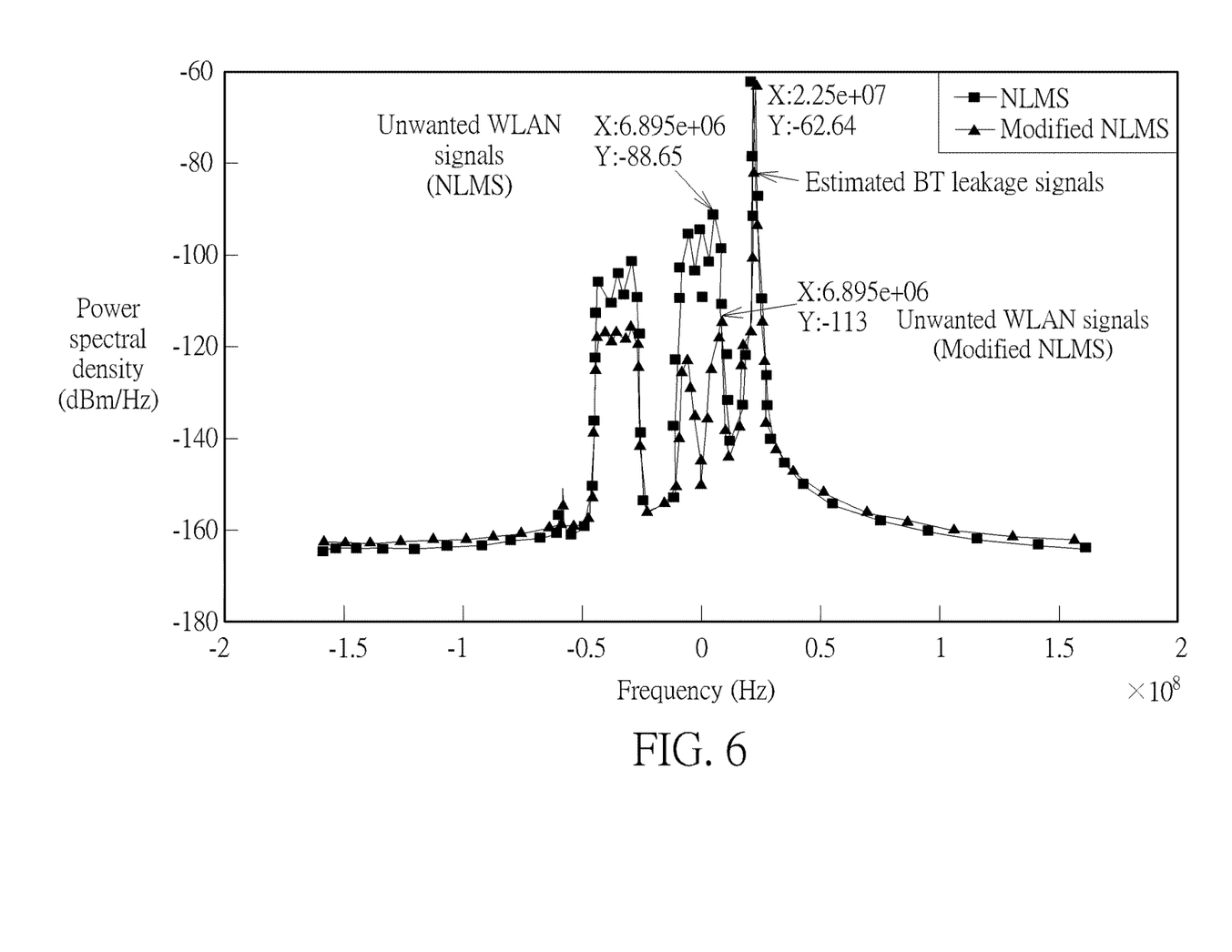
FIG. 6 is a comparison diagram of a power spectral density according to an example of the present invention.

FIG. 6 is a comparison diagram of a power spectral density (PSD) according to an example of the present invention. FIG. 6 shows the PSD of the input signals $y_A[n]$ with the NLMS filter algorithm and the modified NLMS filter algorithm, wherein "NLMS" represents the result of the NLMS filter algorithm and "Modified NLMS" represents the result of the modified NLMS filter algorithm. The input signals $y_A[n]$ is added in the reverse manner (negative value) in the WLAN transmission path, to eliminate the BT leakage signals $\tilde{x}_B[n]$. Thus, the more the BT signal outputs are similar to the BT leakage signals, the better the interference cancellation result is. In FIG. 6, the result of the NLMS filter algorithm is −62.64 dBm/Hz, the result of the modified NLMS filter algorithm is −62.62 dBm/Hz, and the actual BT leakage interference signal is −63.63 dBm/Hz. It is worthy to discuss the result of the intermediate frequency. If there is a signal in this area, the signal interferes with the WLAN signals. According to FIG. 6, the result of the NLMS filter algorithm is −88.63 dBm/Hz, and the result of the modified NLMS filter algorithm is −113 dBm/Hz. Thus, the modified NLMS filter algorithm may reduce the generation of the interference and make the quality of the WLAN signals less affected.

Figure 7:
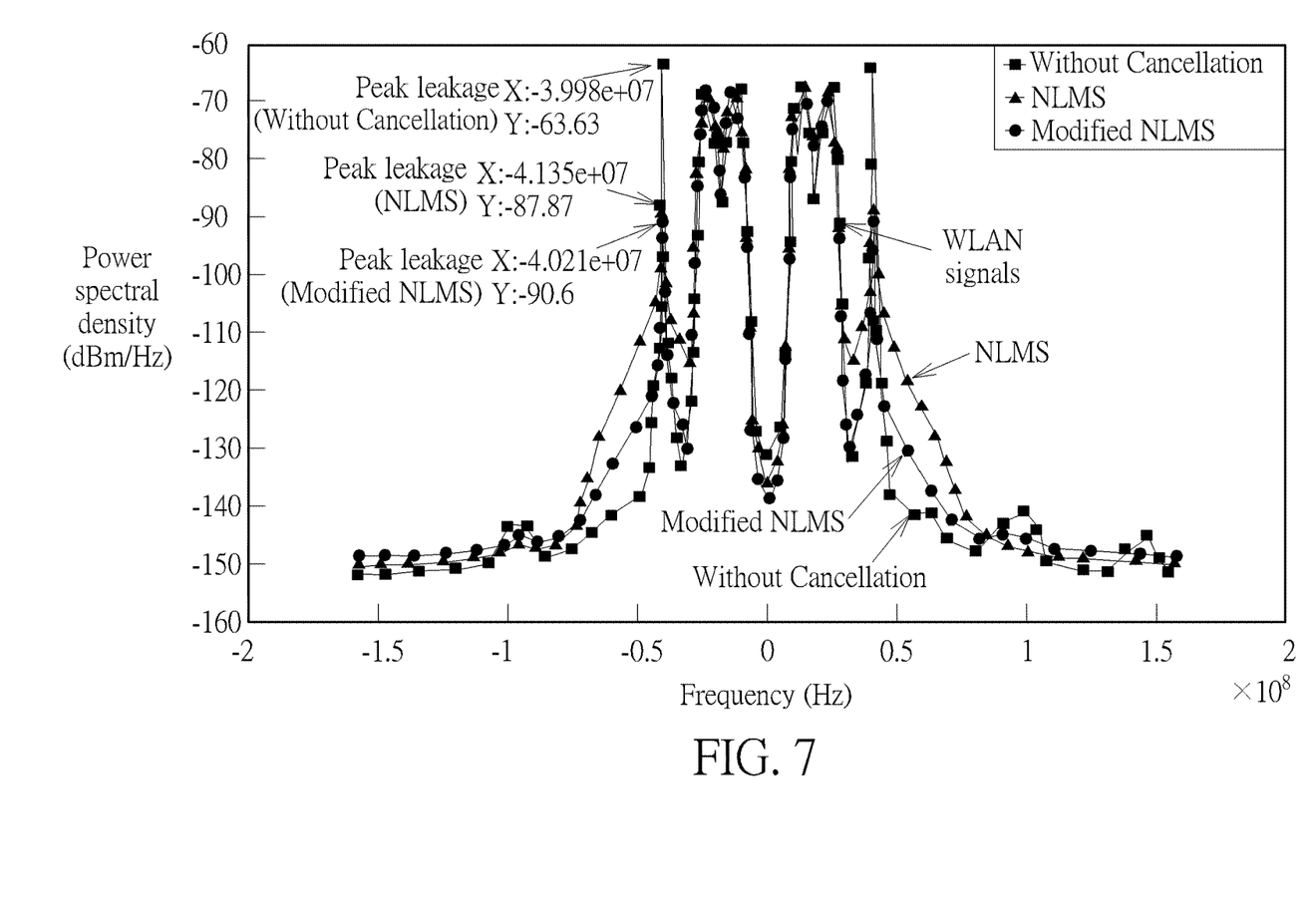
FIG. 7 is a comparison diagram of a power spectral density according to an example of the present invention.

FIG. 7 is a comparison diagram of a PSD according to an example of the present invention. In FIG. 7, the input signals ($\tilde{x}_W[n]+\tilde{x}_B[n]$) of the amplifier 212 caused by different interference cancellation methods are compared: the BT leakage signals without cancellation, the NLMS filter algorithm and the modified NLMS filter algorithm. "Without Cancellation" represents that the result without any interference cancellation, "NLMS" represents the result of the NLMS filter algorithm and "Modified NLMS" represents the result of the modified NLMS filter algorithm. The results obtained according to the above three methods are: −63.63 dBm/Hz, −87.87 dBm/Hz and −90.6 dBm/Hz. After comparing the above differences, the NLMS filter algorithm and the modified NLMS filter algorithm eliminate the interference of 24.24 dB and 26.97 dB, respectively.

Figure 8:
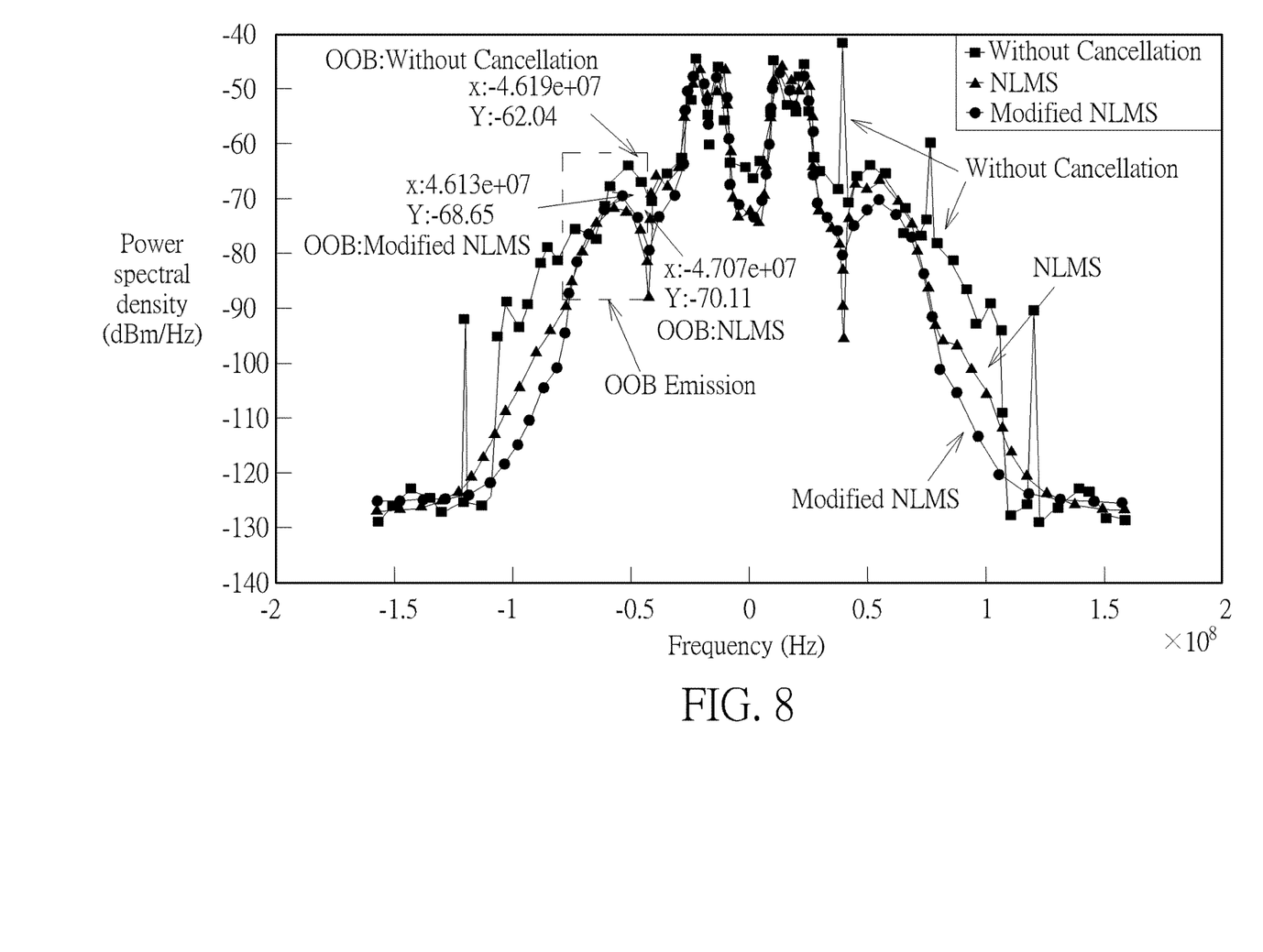
FIG. 8 is a comparison diagram of a power spectral density according to an example of the present invention.

FIG. 8 is a comparison diagram of a PSD according to an example of the present invention. In FIG. 8, the output signals ($y_{W,PO}[n]$) of the amplifier 212 caused by different interference cancellation methods are compared, and the results are the actual results that are measured: the BT leakage signals without cancellation, the NLMS filter algorithm and the modified NLMS filter algorithm. "Without Cancellation" represents that the result without any interference cancellation, "NLMS" represents the result of the NLMS filter algorithm, "Modified NLMS" represents the result of the modified NLMS filter algorithm, "OOB" represents out-of-band, and "OOB Emission" represents an out-of-band emission. The results obtained according to the above three methods are: −62.04 dBm/Hz, −70.11 dBm/Hz and −68.65 dBm/Hz. After comparing the above differences, the NLMS filter algorithm and the modified NLMS filter algorithm eliminate the interference of 8.07 dB and 6.61 dB, respectively.

Figure 9:
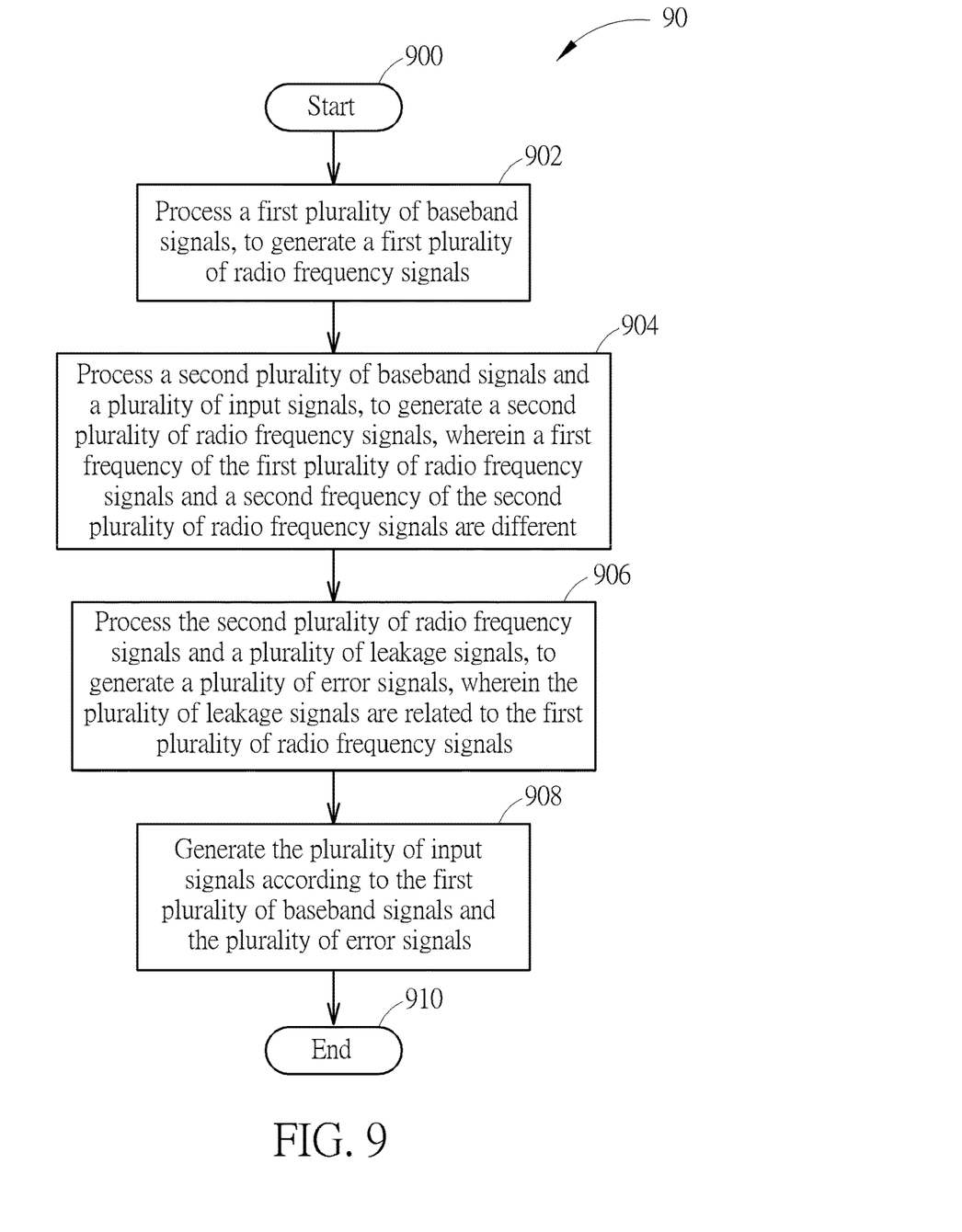
FIG. 9 is a flowchart of a process according to an example of the present invention.

FIG. 9 is a flowchart of a process 90 according to an example of the present invention. The process 90 may be utilized in the transmitting device 20 and includes the following steps:

Step 900: Start.

Step 902: Process a first plurality of baseband signals, to generate a first plurality of radio frequency signals.

Step 904: Process a second plurality of baseband signals and a plurality of input signals, to generate a second plurality of radio frequency signals, wherein a first frequency of the first plurality of radio frequency signals and a second frequency of the second plurality of radio frequency signals are different.

Step 906: Process the second plurality of radio frequency signals and a plurality of leakage signals, to generate a plurality of error signals, wherein the plurality of leakage signals are related to the first plurality of radio frequency signals.

Step 908: Generate the plurality of input signals according to the first plurality of baseband signals and the plurality of error signals.

Step 910: End.

It should be noted that the transmitting circuit 200, the amplifier 202, the transmitting circuit 210, the amplifier 212, the feedback circuit 220 and the control circuit 230 may be integrated into one or more circuits according to design considerations or system requirements. In addition, the transmitting device 20 and the circuit (s) in the transmitting device 20 may be realized by hardware, software, firmware, an electronic system or a combination of the devices mentioned above, but is not limited herein.

To sum up, the present invention provides a device and a method of reducing a signal interference generated by signals of different types via using a feedback circuit and a control circuit when the signals of different types are transmitted simultaneously. Comparing with the prior art, the present invention has not only a better performance but also a lower cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitting device, for handling signal interference, comprising:
   a first transmitting circuit, for processing a first plurality of baseband signals, to generate a first plurality of radio frequency signals;
   a second transmitting circuit, for processing a second plurality of baseband signals and a plurality of input signals, to generate a second plurality of radio frequency signals, wherein a first frequency of the first plurality of radio frequency signals and a second frequency of the second plurality of radio frequency signals are different;
a feedback circuit, coupled to the second transmitting circuit, for processing the second plurality of radio frequency signals and a plurality of leakage signals, to generate a plurality of error signals, wherein the plurality of leakage signals are related to the first plurality of radio frequency signals; and
a control circuit, coupled to the first transmitting circuit, the second transmitting circuit and the feedback circuit, for generating the plurality of input signals according to the first plurality of baseband signals and the plurality of error signals.

2. The transmitting device of claim 1, wherein the control circuit comprises:
a digital frequency shifting (DFS) circuit, coupled to the first transmitting circuit, for processing the first plurality of baseband signals according to the first frequency and the second frequency, to generate a plurality of frequency shifted signals; and
an estimation circuit, coupled to the DFS circuit, the second transmitting circuit and the feedback circuit, for processing the plurality of frequency shifted signals and the plurality of error signals, to generate the plurality of input signals, wherein the plurality of error signals are related to the plurality of leakage signals and the second plurality of radio frequency signals.

3. The transmitting device of claim 2, wherein a third frequency of a plurality of processed signals and the first frequency are the same, when the second transmitting circuit processes the plurality of frequency shifted signals to obtain the plurality of processed signals.

4. The transmitting device of claim 2, wherein the estimation circuit processes the plurality of frequency shifted signals and the plurality of error signals according to a modified normalized least mean square (modified NLMS) filter algorithm.

5. The transmitting device of claim 4, wherein, according to the modified NLMS filter algorithm, the plurality of error signals are defined according to the following equations:

$e[n|k]=d[n]-w_k^H x_n$, and $ê[n|n+1]=e[n|n+1]-e[n-1|n+1]$, wherein $x_n$ is an input vector of the modified NLMS filter algorithm, $w_k$ is a weight vector of the modified NLMS filter algorithm and d[n] are the plurality of leakage signals.

6. The transmitting device of claim 1, wherein the first transmitting circuit comprising:
a first plurality of upsamplers, for processing the first plurality of baseband signals, to generate a first plurality of upsampled signals;
a first plurality of low-pass filters (LPFs), coupled to the first plurality of upsamplers, for filtering the first plurality of upsampled signals, to generate a first plurality of filtered signals; and
a first plurality of mixers, coupled to the first plurality of LPFs, for mixing the first plurality of filtered signals according to the first frequency, to generate the first plurality of radio frequency signals.

7. The transmitting device of claim 1, wherein the second transmitting circuit comprises:
a second plurality of upsamplers, for processing the second plurality of baseband signals, to generate a second plurality of upsampled signals;
a second plurality of LPFs, coupled to the second plurality of upsamplers, for filtering the second plurality of upsampled signals, to generate a second plurality of filtered signals; and
a second plurality of mixers, coupled to the second plurality of LPFs, for mixing the second plurality of filtered signals according to the second frequency, to generate the second plurality of radio frequency signals.

8. The transmitting device of claim 1, wherein the feedback circuit is coupled to the second transmitting circuit via an amplifier.

9. The transmitting device of claim 1, wherein the feedback circuit comprises:
a third plurality of mixers, for mixing the second plurality of radio frequency signals and the plurality of leakage signals according to the second frequency, to generate a plurality of mixed signals;
a third plurality of LPFs, coupled to the third plurality of mixers, for filtering the plurality of mixed signals, to generate a plurality of filtered signals; and
a plurality of decimators, coupled to the third plurality of LPFs, for processing the plurality of filtered signals, to generate the plurality of error signals.

10. The transmitting device of claim 1, wherein the first plurality of baseband signals are Bluetooth signals, and the second plurality of baseband signals are wireless local area network (WLAN) signals.

* * * * *